United States Patent [19]

Vissing

[11] Patent Number: 4,982,524
[45] Date of Patent: Jan. 8, 1991

[54] FISHING HOOK RELEASE

[76] Inventor: E. D. Vissing, P.O. Box 50475, Idaho Falls, Id. 83405

[21] Appl. No.: 421,183

[22] Filed: Oct. 13, 1989

[51] Int. Cl.5 ............... A01K 91/00; A01K 97/00
[52] U.S. Cl. ........................ 43/42.02; 43/17.2; 43/42.72
[58] Field of Search ............... 43/17.2, 42.02, 42.72

[56] References Cited

U.S. PATENT DOCUMENTS

| | | | |
|---|---|---|---|
| 1,438,264 | 12/1922 | Rygh | 43/42.72 |
| 1,444,876 | 2/1923 | Hanson | 43/42.72 |
| 2,079,335 | 5/1937 | Pflueger | 43/17.2 |
| 2,153,489 | 4/1939 | Whitis | 43/17.2 |
| 2,616,203 | 11/1952 | Sarakas | 43/17.2 |
| 2,739,407 | 3/1956 | Godsey | 43/42.15 |
| 2,964,870 | 12/1960 | Dishon | 43/42.02 |
| 3,037,315 | 6/1962 | Klawitter | 43/42.02 |
| 3,465,465 | 9/1969 | Smizaski | 43/42.02 |
| 4,514,926 | 5/1985 | Weber, Sr. | 43/17.2 |
| 4,748,763 | 6/1988 | Giraudo | 43/17.02 |
| 4,794,722 | 1/1989 | Crevoisier | 43/42.02 |

OTHER PUBLICATIONS

*Popular Mechanics,* p. 200, Apr. 1957.

*Primary Examiner*—Kurt Rowan
*Attorney, Agent, or Firm*—Wells, St. John & Roberts

[57] ABSTRACT

Fishing tackle for releasing a hook or lure which has become snagged on an out-of-reach object. The fish hook release includes inner and outer sleeves. The sleeves extend from each other and are urged toward their retracted position by a spring. A hook or lure is attached to an end of the device along the spring axis and a fishing line is attached to the other end of the device. To release a snagged hook, the user pulls on the fishing line to extend the spring and the sleeves. When the user releases the line, the spring pulls the sleeves together. The sudden impact, when the sleeves reach their fully retracted position, imparts a blow to the hook to release it from the hooked object.

5 Claims, 1 Drawing Sheet

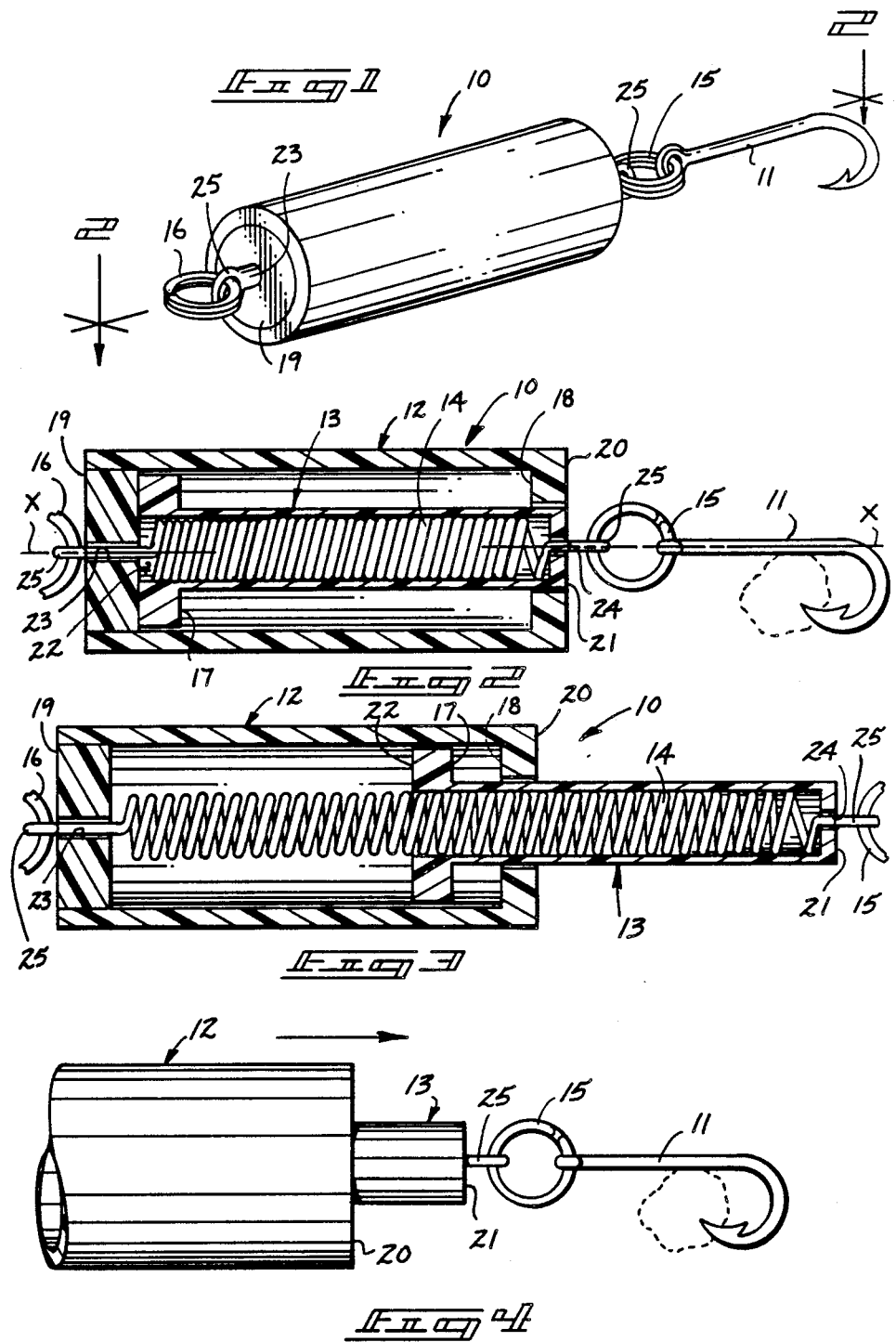

FISHING HOOK RELEASE

TECHNICAL FIELD

This invention relates to fishing tackle for remotely releasing a hook or lure when snagged on an out-of-reach object.

BACKGROUND OF THE INVENTION

Fishing hooks or lures often snag on hard-to-reach objects such as submerged logs or high tree branches. Such a snagged hook is frequently difficult or impossible to reach by hand. Since pulling on the line only further embeds the hook into the hooked object, the user can only free the tackle by breaking the fishing line. Unfortunately, he must sacrifice his hook in the process. Accordingly, it is desirable to provide a device to release a hook from an object even when out of the user'-reach.

Springs have previously been incorporated in fishing tackle products both to aid in hooking a fish (snubbers) and to release a hook from an object. While this invention provides some snubbing action, it is related primarily to a device for releasing a hook when snagged.

Previous fish hook releases have typically used a compression spring to urge two parts of an assembly together. The present invention has certain advantages over the previous devices in that its construction is very simple, the spring is completely enclosed and protected from entanglement with unwanted objects, and a positive stop means is provided to prevent over-extension of the spring.

BRIEF DESCRIPTION OF THE DRAWINGS

The preferred embodiment of the invention is illustrated in the accompanying drawings, in which:

FIG. 1 is a perspective view of the snagged fishing hook release;

FIG. 2 is a longitudinal sectional view showing the release fully retracted;

FIG. 3 is a longitudinal sectional view showing the release partially extended; and FIG. 4 is an enlarged fragmentary elevational overall view showing operation of the release.

DETAILED DESCRIPTION OF THE PREFERRED EMBODIMENTS

The following disclosure of the invention is submitted in furtherance with the constitutional purpose of the Patent Laws "to promote the progress of science and useful arts" (Article 1, Section 8).

Referring to FIGS. 1 through 3, a snagged fish hook release device 10 is shown which incorporates features of this invention.

A tubular outer sleeve 12, centered about axis X—X, has a closed end 19 and an open end 20. A central axial aperture 23 is formed in the closed end 19. An annular flange 18 extends radially inward about a central aperture formed through the open end 20.

A tubular inner sleeve 13, coaxially centered about axis X—X, has a closed end 21 and an open end 22. A central axial aperture 24 is formed through its closed end 21. A radial shoulder 17 extends outwardly about its open end 22.

The inner sleeve 13 slides within the outer sleeve 12, with the closed ends of each sleeve, 19 and 21, arranged at opposite ends of the device along axis X—X. The outer diameter of the radial shoulder 17 is only slightly smaller than the inner diameter of sleeve 12 and the inner diameter of annular flange 18 is only slightly larger than the outer diameter of the sleeve 13. These dimensions provide a snug sliding fit between the sleeves while still allowing them to move axially relative to each other.

A helical tension spring 14 extends from opposite ends of the device 12 along axis X—X. One end of spring 14 extends through the central axial aperture 23, and the other end of the spring 14 extends through the central axial aperture 24. The ends of the spring 14 are enlarged outwardly adjacent to the apertures to form eyelets 25. Split rings 15 and 16 are attached to the eyelets 25 at opposite ends of the device.

In operation, a fishing line (not shown) is attached to split ring 16 and a hook or lure 11 is attached to split ring 15. When the hook 11 becomes snagged, the user pulls on the line, extending spring 14. The sleeves 12 and 13 extend axially apart in opposition to the biasing force of the spring 14 as shown in FIG. 3. Over-extension of the spring is prevented by engagement of radial shoulder 17 and annular flange 18. When the user then suddenly releases the line, the tension spring 14 accelerates the outer sleeve 12 toward the hook as shown in FIG. 4. At the end of its travel, the closed end 19 of the outer sleeve 12 impacts the open end 22 of the inner sleeve 13. This impact imparts a sudden blow to the inner sleeve, and therefore to the hook 11, along the axis X. This blow, being in a direction opposite to the direction of force normally applied to the hook by the line, causes the hook to dislodge from a hooked object (shown at 30 in FIG. 4).

The force applied to the hook is related to the force applied by the spring, the mass of the moving sleeve (the outer sleeve in the preferred embodiment), and the mass of the stationary sleeve (the inner sleeve in the preferred embodiment) and hook. Selection of components and construction of the device will be dictated by this consideration.

For example, the spring 14 is selected to provide both the proper dimensions and the proper tensioning characteristics. Accordingly, the spring selected must be strong enough to accelerate the moving sleeve, but not so strong as to break the fishing line when the fisherman attempts to extend the device. Dimensionally, the spring must be slightly extended when the sleeves are fully retracted, and allow full extension without damage to the spring.

In constructing the sleeves, consideration must be given to both their size and to their weight. While a heavier outer sleeve can impart more force to the hook, it also requires a stronger spring for sufficient acceleration. If the spring is too strong, the fishing line may break when the fisherman attempts to extend the device. Also, a heavy device may not be desirable for certain types of fishing.

Assembly of the device could be facilitated in the preferred embodiment by making the outer sleeve in two pieces. For instance, the closed end 19 could be a separate piece to be glued or otherwise attached to the outer sleeve 12 after the spring is inserted through the first central axial aperture 23.

One familiar with the art will recognize that certain details of the preferred embodiment could be modified without exceeding the scope of the invention. For instance, it is not required that the sleeves be cylindrical or that attachments to hook, line, or spring be made in the illustrated manner. Further, the device could be oriented oppositely, with the line attached to the inner sleeve and the hook attached to the outer sleeve. The outer sleeve could also be colored and shaped so as to form part of a fishing lure.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims appropriately interpreted in accordance with the doctrine of equivalents.

I claim:

1. A snagged fish hook release adapted to be connected between a hook or lure and a line on fishing tackle, comprising:
   (a) a tubular outer sleeve having a closed end and an open end;
   (b) a tubular inner sleeve having a closed end and an open end, the inner sleeve slidably fitting coaxially within the outer sleeve, the closed ends of the outer and inner sleeves being arranged at opposite ends of the device;
   (c) first and second coupling means extending outward at the closed ends of the outer and inner sleeves for attaching them top a hook or lure and a line; and
   (d) resilient means positioned coaxially within the inner sleeve and having opposite ends operably connected to the respective closed ends of the outer and inner sleeves for normally biasing the inner sleeve to a retracted position within the outer sleeve.

2. A snagged fish hook release adapted to be connected between a hook or lure and a line on fishing tackle, comprising:
   (a) a tubular outer sleeve having a closed end and an open end;
   (b) a tubular inner sleeve having a closed end and an open end, the inner sleeve slidably fitting coaxially within the outer sleeve, the closed ends of the outer and inner sleeves being arranged at opposite ends of the device;
   (c) first and second coupling means extending outward at the closed ends of the outer and inner sleeves for attaching them to a hook or lure and a line; and
   (d) a helical tension spring positioned coaxially within the inner sleeve and having opposite ends operably connected to the respective closed ends of the outer and inner sleeves for normally biasing the inner sleeve to a retracted position within the outer sleeve.

3. The snagged fish hook release of claim 1, further comprising:
   stop means for limiting extension of the inner sleeve form the outer sleeve.

4. The snagged fish hook release of claim 3 wherein the stop means comprises:
   (a) a radial flange extending about the open end of the outer sleeve; and
   (b) a radial shoulder extending outwardly about the open end of the inner sleeve, the shoulder having a diameter larger than the diameter of the flange, whereby extension of the inner sleeve from the outer sleeve is limited by engagement between the flange and shoulder when the inner sleeve is fully extended.

5. A snagged fish hook release device for connection between a hook or lure and a line on fishing tackle, comprising:
   (a) a tubular outer sleeve formed about a central axis having a closed end and an open end, the outer sleeve having a first central axial aperture formed through its closed end and an annular flange extending radially about its open end;
   (b) a tubular inner sleeve formed about a central axis having a closed end and an open end, a second central axial aperture being formed in the closed end of the inner sleeve, a radial shoulder extending outwardly about the open end of the inner sleeve, the shoulder having a diameter larger than the inside diameter of the flange;
   (c) the inner sleeve slidably fitting within the outer sleeve with the closed ends of the outer sleeve and the inner sleeve oriented axially opposite to one another, whereby extension of the inner sleeve from the outer sleeve is limited by engagement between the flange and the shoulder; and
   (d) a helical tension spring positioned coaxially within the inner sleeve and having first and second axial ends,
      (i) the first end of the spring extending through the first central axial aperture and forming an enlargement outwardly adjacent to the closed end of the outer sleeve,
      (ii) the second end of the spring extending through the second central axial aperture and forming an enlargement outwardly adjacent to the closed end of the outer sleeve, and
      (iii) the spring urging the open end of the inner sleeve toward a retracted position abutting the closed end of the outer sleeve.

* * * * *